(12) United States Patent
Chitanavong et al.

(10) Patent No.: US 8,010,397 B1
(45) Date of Patent: Aug. 30, 2011

(54) ENTERPRISE INFRASTRUCTURE DEVELOPMENT SYSTEMS AND METHODS

(75) Inventors: Chon Chitanavong, Olathe, KS (US); Robert F. Foster, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1255 days.

(21) Appl. No.: 11/626,083

(22) Filed: Jan. 23, 2007

(51) Int. Cl.
*G06Q 10/00* (2006.01)
(52) U.S. Cl. ...................... 705/7.13; 705/7.26
(58) Field of Classification Search .......... 705/7, 7.13, 705/7.26
See application file for complete search history.

(56) References Cited

U.S. PATENT DOCUMENTS

| | | | | |
|---|---|---|---|---|
| 6,088,679 | A * | 7/2000 | Barkley | 705/7.26 |
| 6,249,768 | B1 * | 6/2001 | Tulskie et al. | 705/7 |
| 6,269,474 | B1 * | 7/2001 | Price | 717/104 |
| 7,251,613 | B2 * | 7/2007 | Flores et al. | 705/7.36 |
| 7,292,990 | B2 * | 11/2007 | Hughes | 705/7.14 |
| 7,321,864 | B1 * | 1/2008 | Gendler | 705/7.15 |
| 7,383,251 | B2 * | 6/2008 | Might | 1/1 |
| 7,401,031 | B2 * | 7/2008 | Hughes | 705/7.13 |
| 7,406,432 | B1 * | 7/2008 | Motoyama | 705/7.16 |
| 7,603,653 | B2 * | 10/2009 | Sundararajan et al. | 717/105 |
| 7,627,750 | B1 * | 12/2009 | Chan | 713/156 |
| 7,778,866 | B2 * | 8/2010 | Hughes | 705/7.42 |
| 7,809,595 | B2 * | 10/2010 | Breslin et al. | 705/7.28 |
| 7,861,227 | B2 * | 12/2010 | Motoyama et al. | 717/124 |
| 2002/0194100 | A1 * | 12/2002 | Choban et al. | 705/36 |
| 2003/0046125 | A1 * | 3/2003 | Flores | 705/7 |
| 2003/0182172 | A1 * | 9/2003 | Claggett et al. | 705/9 |
| 2003/0192029 | A1 * | 10/2003 | Hughes | 717/101 |
| 2003/0212584 | A1 * | 11/2003 | Flores | 705/7 |
| 2004/0143470 | A1 * | 7/2004 | Myrick et al. | 705/7 |
| 2005/0160395 | A1 * | 7/2005 | Hughes | 717/102 |
| 2005/0203764 | A1 * | 9/2005 | Sundararajan et al. | 705/1 |
| 2005/0216882 | A1 * | 9/2005 | Sundararajan et al. | 717/104 |
| 2006/0069605 | A1 * | 3/2006 | Hatoun | 705/9 |
| 2006/0184928 | A1 * | 8/2006 | Hughes | 717/168 |
| 2006/0229929 | A1 * | 10/2006 | Hughes | 705/9 |
| 2006/0248504 | A1 * | 11/2006 | Hughes | 717/101 |
| 2007/0180490 | A1 * | 8/2007 | Renzi et al. | 726/1 |
| 2007/0185754 | A1 * | 8/2007 | Schmidt | 705/9 |
| 2008/0047018 | A1 * | 2/2008 | Baudoin et al. | 726/25 |
| 2008/0052146 | A1 * | 2/2008 | Messinger et al. | 705/9 |
| 2008/0320436 | A1 * | 12/2008 | Hughes | 717/100 |
| 2009/0265787 | A9 * | 10/2009 | Baudoin et al. | 726/25 |
| 2010/0017250 | A1 * | 1/2010 | Bangs et al. | 705/8 |
| 2010/0262473 | A1 * | 10/2010 | Hughes | 705/14.11 |

OTHER PUBLICATIONS

Bone, Steve; Saxon, Tim; "Developing Effective Technology Strategies", Jul./Aug. 2000, Research Technology Management; 43, 4; ABI/Inform Global, p. 50.*

Northover, Mark; "Developing a Successful Information Technology Competency Strategy for Faculty and Staff", Jan. 1999, The Technology Source, pp. 1-6, ts.mivu.org/defaultasp?show=article&id=1034.*

(Continued)

*Primary Examiner* — Jonathan G Sterrett (57) ABSTRACT

A method for architectural review is provided. Project data is submitted to an architecture audit team. An exception to an approved technology for the project data is conveyed to a technology management team comprising subject matter experts from each of multiple domains. A recommendation regarding the exception to the approved technology for the project data is conveyed to an architecture review committee comprising a director representative from each domain. A decision on the recommendation regarding the exception is recorded.

17 Claims, 6 Drawing Sheets

OTHER PUBLICATIONS

Nordberg, Markus; et.al.; "Can market-based contracts substitute for alliances in technology markets", 1996, Journal of International Business Studies, v27n5, pp. 963-979, Dialog 01362787 00-13774.*

"Simula's Technology used in new second chance body armor inc. product", Jan. 2, 2001, Advanced Materials & Composites News, v23, n507, pNA, Dialog 08175603 68546442.*

"How to manage innovation", Nov. 11, 1996, Traffic World, v248, n6, p. 41+, Dialog 011115915 23702707.*

Meyer, Marc H; Mugge, Paul C; "Make Platform Innovation Drive Enterprise Growth", Jan./Feb. 2001, Research Technology Management, 44, 1; ABI/Inform Global, p. 25.*

Kumar, Vinod: Boyle, Todd; "A Quality Management Implementation for Manufacturing-based R&D Environments", 2001, The International Journal of Quality & Reliability Management, 18, 3; ABI/Inform Global, p. 336.*

Neufville, Richard de; Pirnar, Ali; "A Dynamic Technology Strategy for Xerox to Respond to the Threat of High-Tech Commoditization", Sep. 30. 1996, MIT's TPP program, ardent.mit.edu/real_options/Real_opts_papers/a_dynamic_technology_stratey_for_Xerox.pdf.*

McGrath, Michael E. "Setting the PACE in Product Development", © 1996, Butterworth-Heinemann, pp. 1-176.*

* cited by examiner

| DISCUSSION 402 | If this request is not approved ITS will not be able to deliver on it's commitments for the customer's requested functionality. Our collocation customers (other wireless providers that pay us upwards of $15,000 per month to sit on our antenna space) will not be able to maintain records of their request for service. [FIELD ENGR & OPERATING SYSTEMS] Our organization is willing and able to provide full lifecycle support and maintenance for this product. |
|---|---|
| ACTION ITEMS 404 | All patches and security updates will be applied with appropriate change control once notified by vendor that a necessary release(s) have been made. NONE |
| ARC VOTING RESULT 406 | APPROVED |

FIG. 5

TECHNOLOGY MANAGEMENT TEAM FORM 202A

| TMT VOTING RESULT 502 | APPROVED |
|---|---|
| TMT MEMBERS 504 | TMT Members Website |

FIG. 6

ARCHITECTURE REVIEW COMMITTEE FORM 202-D

| 5/8/2006 | 11:00 AM – 1:00 PM | 6180 Conference Center – Room 1B667 |
|---|---|---|

602 →

604 →
- Optimize and align IT Investment with Business and IT units.
- Reduce inconsistencies across implementations via standards.
- Provide guidance of "best practice" technologies.
- Reduce Costs and Complexity.
- Encourage reusability at the application, data, and application integration layers.
- Eliminate redundancy in projects.
- Provide guidance on Technology Selections.

606 → Facilitator Name

608 → Dial-In Number | PIN CODE: 12345

610 → On Line Meeting Website

ENTERPRISE INFRASTRUCTURE DEVELOPMENT SYSTEMS AND METHODS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Enterprise architects evaluate technologies currently used by an enterprise and technologies potentially used by the enterprise. Such an evaluation may produce an approved technology list that specifies which technologies offer the best value for the enterprise in terms of purchasing and maintaining technology. Despite the production of an approved technology list, a project manager may approve a proposed project that uses a technology that is not on the approved technology list. Implementing a technology that is an exception to the approved technology list may result in architectural impacts throughout the enterprise, far beyond the area of expertise for the approving project manager. Architectural impact is an effect created by a project on approved technology for an enterprise. For example, a project creates architectural and technology impacts by using a software application which requires a security patch to be compatible with an approved security system.

Enterprise architects also evaluate projects according to architectural guiding principles. All standard path projects are evaluated to determine architectural impacts security. As a part of a software lifecycle process methodology, enterprise architects initially review all projects to ensure that no projects deploy that cause disruption, increase costs, or drive technologies that create support and maintenance issues. After an initial review by the enterprise architects, if a project is compliant according to the enterprise architecture guiding principles, the enterprise architects will sign-off on the project architecture and recommend that an architecture review committee approve the project. If a project is not compliant with the enterprise architecture guiding principles, the enterprise architects will work with a project team to ensure project compliance is achieved and that the project aligns with the organization enterprise architecture. Once project compliance is achieved, the enterprise architects will sign-off on the project architecture and recommend that the architecture review committee approve the project.

Evaluating architectural impacts may be a lengthy and duplicative process. For example, employees in each of the numerous domains, or subdivisions, in the enterprise may hold their own meeting to evaluate architectural impacts. In these numerous meetings, the employees may evaluate architectural impacts in their own domain without any information about how the project may impact other domains in the enterprise. Alternatively, one large evaluation meeting between the directors for each domain in the enterprise would be unproductive because the directors may not have the detailed knowledge to properly evaluate architectural impacts. The significant time that would be required to develop such knowledge in a large meeting would constitute a waste of time for the many directors of domains not impacted by the project. In yet another alternative, enterprise architects may make project decisions based on architectural impacts. However, project managers would have to lobby to overturn project decisions made by enterprise architects because the enterprise architects often fail to take all project considerations into account. The above-described situations present unique problems that are not adequately addressed by existing enterprise infrastructure development systems.

SUMMARY

Disclosed herein are systems and methods for enterprise infrastructure development. In some method embodiments, project data is submitted by a review facilitation tool to an architecture audit team. An exception to an approved technology for the project data is conveyed by the review facilitation tool to a technology management team comprising subject matter experts from each of multiple domains. A recommendation regarding the exception to the approved technology for the project data is conveyed by the review facilitation tool to an architecture review committee comprising a director representative from each domain. A decision on the recommendation regarding the exception is recorded by the review facilitation tool.

Some system embodiments include a server to submit project data to an architecture audit team; convey an exception to an approved technology for the project data to a technology management team comprising subject matter experts from each of multiple domains; convey a recommendation regarding the exception to the approved technology for the project data to an architecture review committee comprising a director representative from each domain; and record a decision on the recommendation regarding the exception.

In computer program product embodiments, computer readable program code is configured to submit project data to an architecture audit team; to convey an exception to an approved technology for the project data to a technology management team comprising subject matter experts from each of multiple domains; to convey a recommendation regarding the exception to the approved technology for the project data to an architecture review committee comprising a director representative from each domain; to convey a recommendation regarding the project data to the architecture review committee; and to record a decision on the recommendations.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

It should be understood at the outset that although implementations of various embodiments of the present disclosure are described below, the present system may be implemented using any number of techniques, whether currently known or in existence. The present disclosure should in no way be limited to the implementations, drawings, and techniques described below, but may be modified within the scope of the appended claims along with their full scope of equivalents.

In embodiments of the present disclosure, systems and methods for enterprise infrastructure development are provided. Project managers use a review facilitation tool to submit data for a project to an architecture audit team of enterprise architects. If the architecture audit team identifies an exception to an approved technology for the submitted project, the teams uses the review facilitation tool to capture and convey the exception to a technology management team of subject matter experts from each domain. Because the subject matter experts are appointed from each domain, the technology management team can take into account architectural considerations, operational considerations, financial considerations, and business considerations for the submitted project, in contrast to project decisions made by enterprise architects that often fail to take all project considerations into account.

The technology management team uses the review facilitation tool to record a recommendation by regarding the exception, and to convey the recommendation on a form to an architecture review committee of director representatives from each domain. The recommendation form saves director time by listing a summary for director representatives whose domains are not impacted architecturally and by providing links to details for director representatives whose domains are impacted architecturally. Because the director of each domain appoints at least one of the subject matter experts on the technology management team, the recommendation form includes all the information needed by the architecture review committee to make a decision on the recommendation regarding the exception, such as architectural considerations, operational considerations, financial considerations, and business considerations. Then the architecture review committee uses the review facilitation tool to record the architecture review committee decision.

Figure 1:
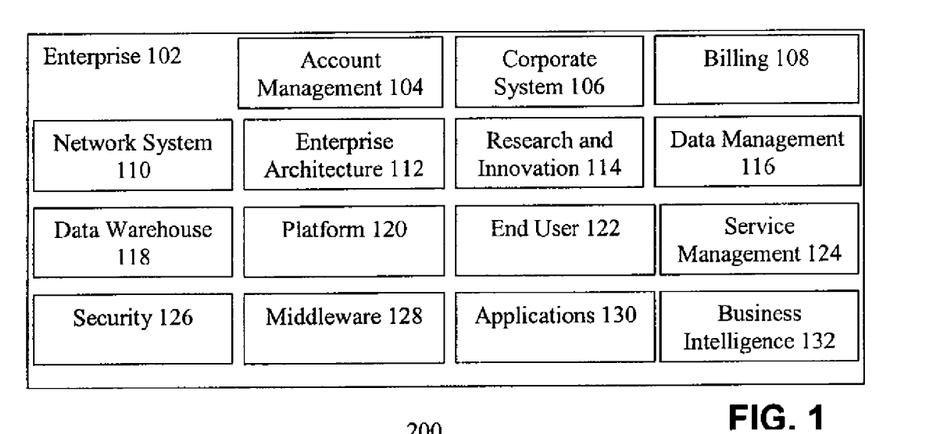
FIG. 1 shows an illustrative enterprise having a set of domains.

Turning now to FIG. 1, an illustrative enterprise 102 is shown having a set of domains. The enterprise 102 has an account management 104 domain, a corporate system 106 domain, a billing 108 domain, a network system 110 domain, an enterprise architecture 112 domain, a research and innovation 114 domain, a data management 116 domain, a data warehouse 118 domain, a platform 120 domain, an end user 122 domain, a service management 124 domain, a security 126 domain, a middleware 128 domain, an applications 130 domain, and a business intelligence 132 domain. Although these domains are shown as separate entities within the enterprise 102, projects approved by project managers of any domain may have an architectural impact on the other domains. The numbers and types of each domain in FIG. 1 are depicted for the purpose of an illustrative example only, and other embodiments would be recognized by those of skill in the art.

Figure 2:
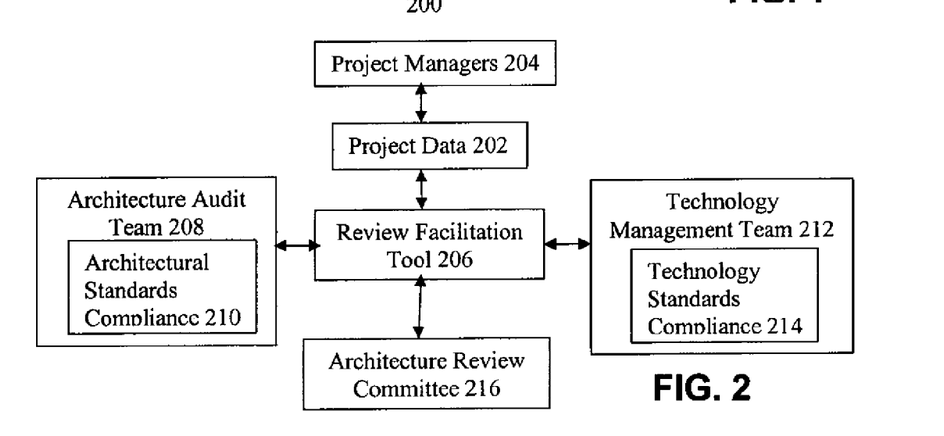
FIG. 2 shows a block diagram of an illustrative enterprise infrastructure development system according to some embodiments of the present disclosure.

Turning now to FIG. 2, a block diagram of an illustrative enterprise infrastructure development system 200 is depicted according to some embodiments of the present disclosure. The system 200 includes project data 202 that is input by project managers 204 and stored by a review facilitation tool 206. The project data 202 can include information such as technologies used by a project, where the project may be a proposed project or an approved project. The project managers 204 can include solution architects that input project data 202 which includes architecture solutions for projects that are not compliant with architecture guiding principles. The project data 202 can also include additional information about the project that is subsequently recorded by the review facilitation tool 206 based on input from other enterprise employees.

The review facilitation tool 206 can submit the project data 202 to an architecture audit team 208. The architecture audit team 208 can include enterprise architects that are familiar with various categories of architectural standards compliance 210, such as compliance rules for application layer, data layer, integration layer, technology, disaster recovery, and security.

If the architecture audit team 208 identifies an exception to an approved technology for the project data, the review facilitation tool 206 can capture and convey the exception to the approved technology for the project data to a technology management team 212 comprising subject matter experts from each domain, such as the domains depicted in FIG. 1. The exception can be a proposed project architecture solution that does not meet architectural guiding principles. The director of each domain can appoint at least one subject matter expert on the technology management team 212. The technology management team 212 can include subject matter experts that are familiar with various categories of technology standards compliance 214, such as compliance rules for application layer, data layer, integration layer, technology, disaster recovery, and security. If the technology management team 212 makes a recommendation regarding the exception to an approved technology for the project data, the review facilitation tool 206 can capture and convey the recommendation regarding the exception to the approved technology for the project data to an architecture review committee 214 comprising a director representative from each domain. The director representative from a domain can be the director from the domain or a representative appointed by the director of the domain.

Figure 3:
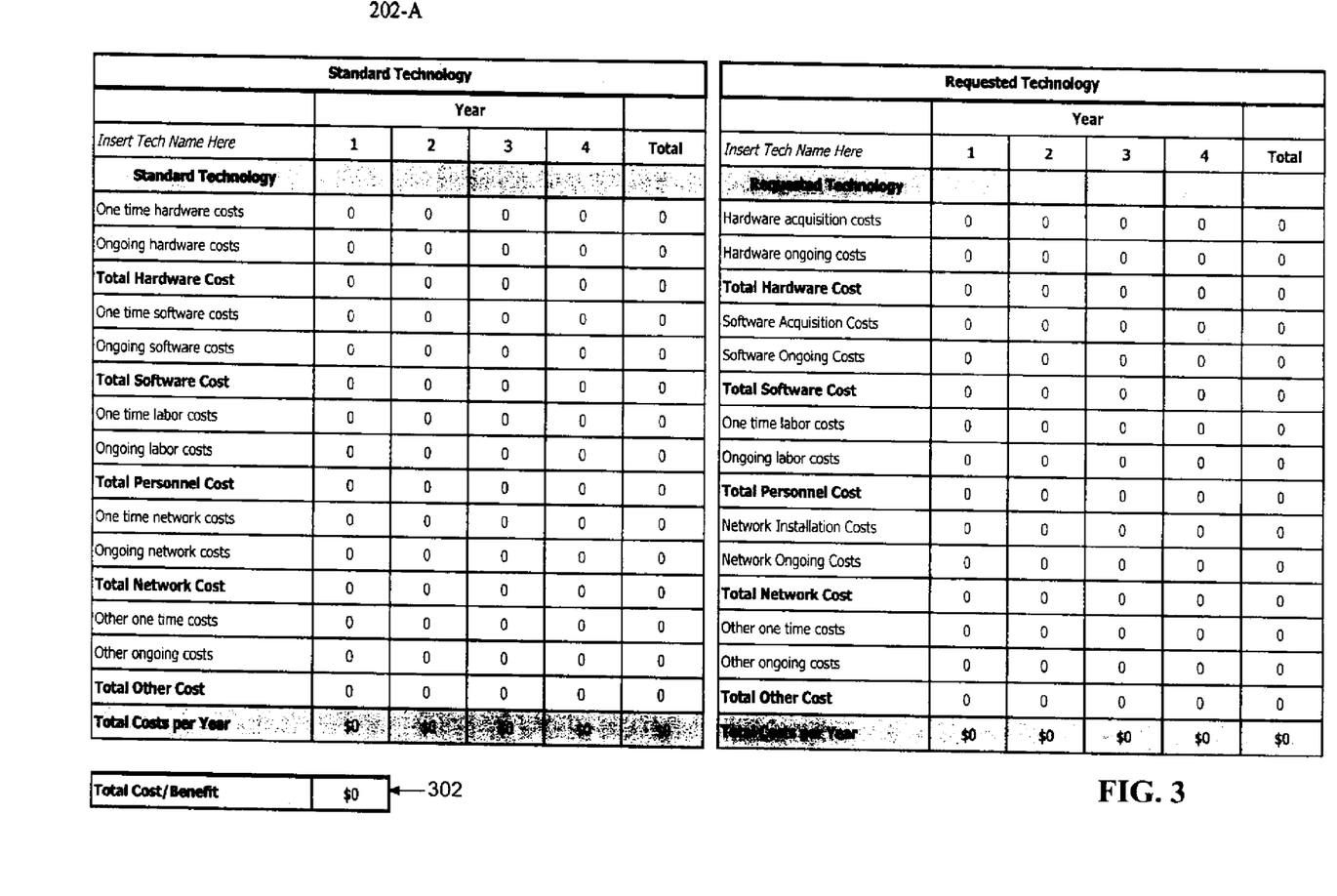
FIG. 3 shows an illustrative project submittal form according to some embodiments of the present disclosure.

Turning now to FIG. 3, an illustrative project submittal form 202-A is depicted according to some embodiments of the present disclosure. The project submittal form 202-A is part of the project data 202 stored and displayed by the review facilitation tool 206. The review facilitation tool 206 can display the project submittal form 202-A to prompt project managers 204 to submit project data 202 for proposed projects. The review facilitation tool 206 can also process inputs to the project submittal form 202-A and store the processed project submittal form 202-A. Project managers 204 can input estimated hardware costs, software costs, labor costs, and network costs for proposed projects, as depicted by examples in the project submittal form 202-A. The estimated costs can be based on standard, or approved, technologies and requested, or non-approved, technologies. The review facilitation tool 206 can process inputs to the project submittal form 202-A and calculate a total cost/benefit 302 based on estimated benefits that outweigh estimated costs.

Figure 4:
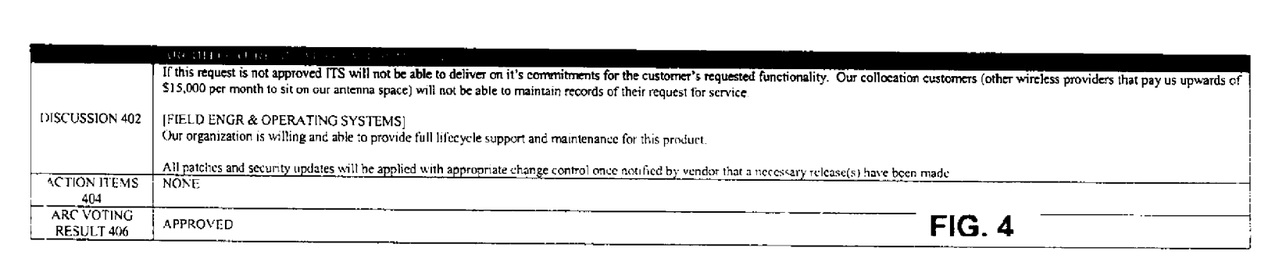
FIG. 4 shows an illustrative architecture audit team form according to some embodiments of the present disclosure.

Turning now to FIG. 4, an illustrative architecture audit team form 202-B is depicted according to some embodiments of the present disclosure. The architecture audit team form 202-B is part of the project data 202 stored and displayed by the review facilitation tool 206. The architecture audit team form 202-B includes a discussion 402 section, an action items 404 section, and an ARC voting results 406 section. The architecture audit team 208 meets to discuss a submitted project, determine if any exception exists to approved technology for the submitted project, and the review facilitation tool 206 records the determination about any exception in sections 402-406.

The discussion 402 section summarizes the discussion input by the architecture audit team 208 about the submitted project, and can identify any architectural area of non-compliance for a project, such as application integration. The action 404 section specifies any required actions to bring an exception into compliance, such as providing a security patch strategy for a new software application. The ARC voting result 406 section specifies how the architecture audit team 208 voted on the submitted project, such as "approved," or "rejected." The summary listed in the discussion 402 section can serve as the basis for the discussion of any meeting of the technology management team 212 and as the basis for the meeting of the architecture review committee 216.

Figure 5:
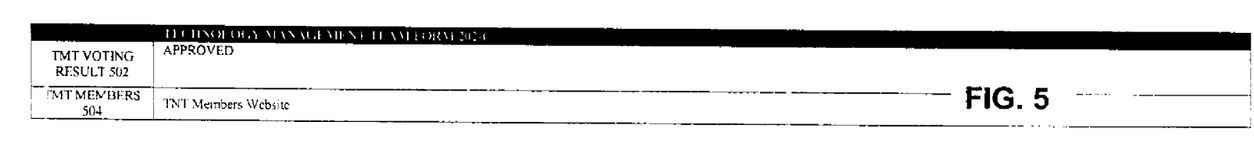
FIG. 5 shows an illustrative technology management team form according to some embodiments of the present disclosure.

Turning now to FIG. 5, an illustrative technology management team form 202-C is depicted according to some embodiments of the present disclosure. The technology management team form 202-C is part of the project data 202 stored and displayed by the review facilitation tool 206. The technology management team form 202-C includes a TMT voting result 502 section and a TMT members 504 section. The technology management team 212 meets to discuss an exception to approved technology for the submitted project, and make recommendations regarding the exception. The review facilitation tool 206 captures and stores the recommendation in sections 502-504. The TMT voting result 502 section provides how the technology management team 212 voted regarding the exception to approved technology for the submitted project, such as "approved," or "rejected." The TMT members 504 section provides a website address where the full details of the technology management team 212 discussion of the project can be located, which can include the voting record for each subject matter expert on the technology management team 212. The details listed in the TMT members 504 section can serve as the basis for the meeting of the architecture review committee 216.

Figure 6:
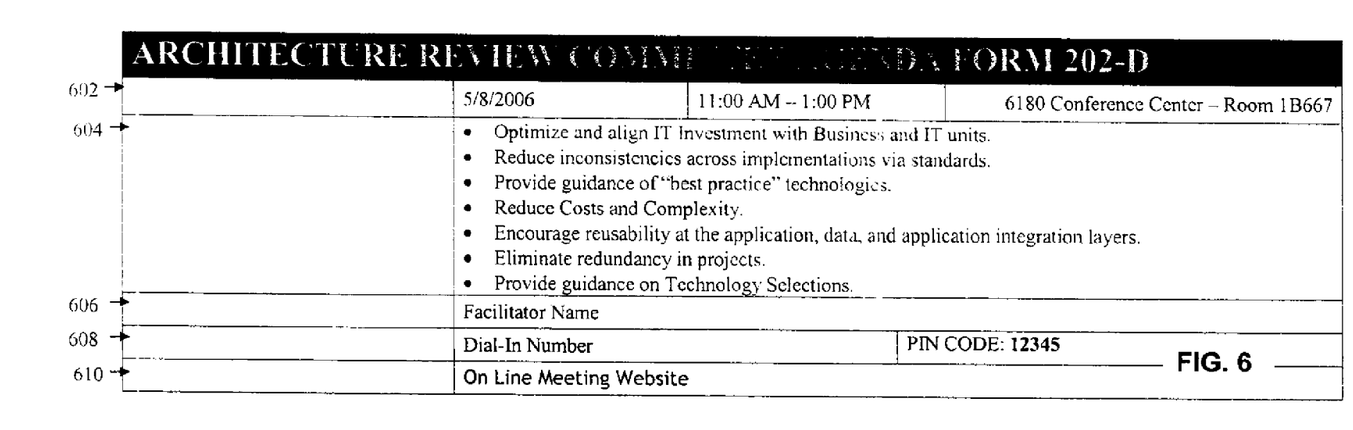
FIG. 6 shows an illustrative architecture review agenda form according to some embodiments of the present disclosure.

Turning now to FIG. 6, an illustrative architecture review committee agenda form 202-D is depicted according to some embodiments of the present disclosure. The architecture review committee agenda form 202-D is part of the project data 202 stored and displayed by the review facilitation tool 206 to the architecture review committee 216, which includes director representatives. Each director representative on the architecture review committee 216 can review the architecture review committee agenda form 202-D before the meeting of the architecture review committee 216 to determine the subject matter of the meeting. After the meeting of the architecture review committee 216, the architecture review committee agenda form 202-D can serve as a partial record of the meeting.

The architecture review committee agenda form 202-D includes a minutes 602 section, a meeting objectives 604 section, a facilitator 606 section, a dial-in 608 section, and an on-line meeting 610 section. The minutes 602 section specifies the date, time, and location for a meeting of the architecture review committee 216. The meeting objectives 604 section provides a list of objectives for the meeting of the architecture review committee 216, with the objectives based on recommendations recorded and displayed by the review facilitation tool 206 for the architecture audit team 208 and the technology management team 212. The facilitator 606 section provides the name of the individual(s) or domain responsible for facilitating the meeting of the architecture review committee 216. The dial-in 608 section provides the telephone number and security code for director representatives to use to participate in the meeting of the architecture review committee 216 by telephone. The on-line meeting 610 section provides the website for director representatives to use to participate in the meeting of the architecture review committee 216 over the internet.

Figure 7:
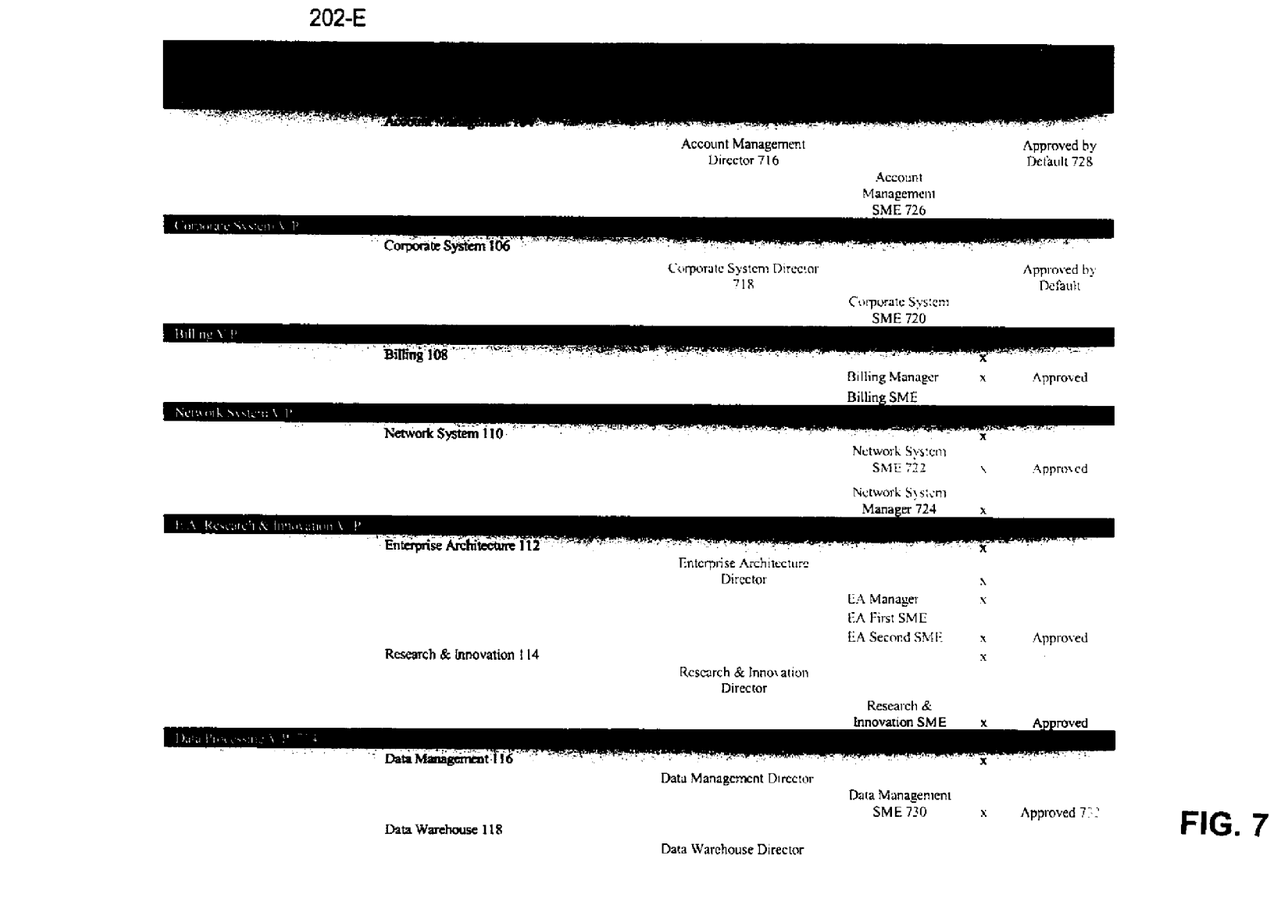
FIG. 7 shows an illustrative attendance form according to some embodiments of the present disclosure.

Turning now to FIG. 7, an illustrative attendance form 202-E is depicted according to some embodiments of the present disclosure. The attendance form 202-E is part of the project data 202 stored and displayed by the review facilitation tool 206, and begins as a template before the meeting of the architecture review committee 216, with spaces listed for the director representatives potentially participating in the meeting. The attendance form 202-E serves as a record of the meeting of the architecture review committee 216, recording which director representatives participated in the meeting and any voting results for each of the director representatives.

The attendance form 202-E includes a vice president 702 column, a domain 704 column, a director 706 column, a manager/SME 708 column, a date 710 column, and a project 712 column. The vice president 702 column lists a vice president responsible for a domain or set of domains. For example, a data processing V.P. 714 is responsible for the data management 116 domain and the data warehouse 118 domain.

The domain 704 column lists each domain of the enterprise to be represented at the meeting of the architecture review committee 216, such as the domains depicted in FIG. 1. For example, the enterprise architecture 112 domain and the research and innovation 114 domain are represented at the meeting of the architecture review committee 216. The director 706 column lists the director for each domain. For example, the director 706 column lists an account management director 716 is the director for the account management 104 domain listed by the domain 704 column.

The manager/SME 708 column lists the managers and the SME's (subject matter experts) appointed by the director for each domain. For example, a corporate system director 718 attends the architecture review committee meeting and appoints a corporate system SME 720 as another director representative for the architecture review committee meeting. In contrast, the network system director is not listed as participating in the architecture review committee meeting, but the network system director has appointed a network system SME 722 and a network system manager 724 as director representatives for the architecture review committee meeting.

The date 710 column lists which director representatives participated on the date of the meeting of the architecture review committee 216. For example, the absence of an "x"

corresponding to the account management director 716 under the date "⅝" column indicates that the account management director 716 did not participate during the architecture review committee meeting held on May 8th.

The project 712 column lists how each director representative voted on the project discussed during the meeting of the architecture review committee 216. For example, neither of the two potential director representatives for the account management 104 domain, the account management director 716 and an account management SME 726, participated during the meeting of the architecture review committee 216 held on May 8th. Therefore, the vote for the account management 104 domain is listed under the project 712 column for project "D2489.657" as "approved by default" 728. In contrast, a data management SME 730 participated during the meeting of the architecture review committee 216 held on May 8th and voted for the project. Therefore, the vote for the data management 116 domain is listed under the project 712 column for project "D2489.657" as "approved" 732.

Figure 8:
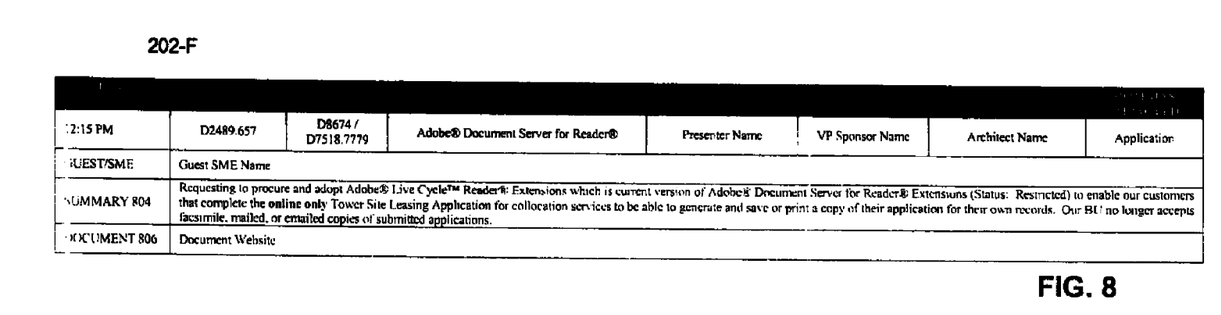
FIG. 8 shows an illustrative recommendation form according to some embodiments of the present disclosure.

Turning now to FIG. 8, an illustrative recommendation form 202-F is depicted according to some embodiments of the present disclosure. The recommendation form 202-F is part of the project data 202 stored and displayed by the review facilitation tool 206, and begins as a template. First, the review facilitation tool 206 records any exceptions to approved technology for the submitted project in the architecture audit team report 202-B. Next, the review facilitation tool 206 records any recommendation regarding the exception to the approved technology for the submitted project in the technology management team report 202-C. Then the review facilitation tool 206 records in the recommendation form 202-F any decision by the architecture review committee 216 on the recommendation regarding the exception.

The recommendation form 202-F includes a concept 802 section, a summary 804 section, and a document 806 section. The review facilitation tool 206 stores the data input by facilitator of the architecture review committee 216 in sections 802-806 in a database. The database includes records of previously approved exceptions and records of discussion as points of reference for future similar exceptions. The concept 802 section provides the project discussed during the meeting of the architecture review committee 216. The summary 804 section provides a summary of any decision made by the meeting of the architecture review committee 216 on a recommendation regarding an exception to an approved technology for the submitted project. The document 806 section provides a website address where the complete discussion input can be located for the decision made by the meeting of the architecture review committee 216 on a recommendation regarding an exception to an approved technology for the submitted project.

Figure 9:
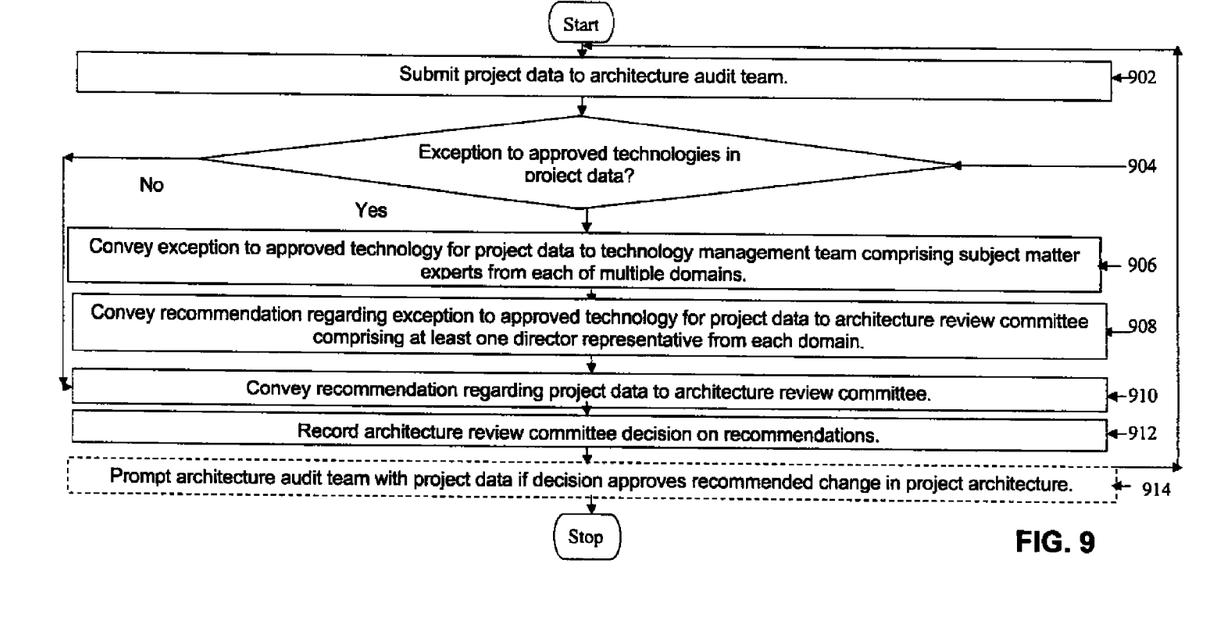
FIG. 9 shows an illustrative enterprise infrastructure development method according to some embodiments of the present disclosure.

Turning now to FIG. 9, an illustrative enterprise infrastructure development method is depicted according to some embodiments of the present disclosure. Executing the enterprise infrastructure development method depicted in FIG. 9 results in the review facilitation tool 206 submitting a project to the architecture audit team 208, conveying exceptions to the technology management team 212, and conveying recommendations regarding exceptions to the architecture review committee 216, and recording a architecture review committee decision based on the recommendation.

In box 902, the project managers 204 use the review facilitation tool 206 to submit the project data 202 to the architecture audit team 208. For example, after the review facilitation tool 206 stores the project data 202 input by the project managers 204 on the project submittal form 202-A, the review facilitation tool 206 submits the project data 202 to the architecture audit team 208.

In box 904, the architecture audit team 208 uses the review facilitation tool 206 to determine whether there are exceptions to approved technologies in the project data 202. For example, the architecture audit team 208 identifies an exception to an approved technology for the submitted project, the purchase of a new software application program that is not listed as an approved technology, an identification captured and recorded by the review facilitation tool 206 in the discussion 402 section depicted in FIG. 4. Continuing this example, the architecture audit team 208 determines that the architectural impact of the submitted project is the installation of patches and security updates to integrate the new software application program in the enterprise, captured and recorded by the review facilitation tool 206 in the action items 404 section. Then, the architecture audit team 208 votes on exception identified for the new software application project; and the review facilitation tool 206 captures and records the voting result in ARC voting result 406 section.

If the architecture audit team 208 determines that there are exceptions to approved technologies in the project data 202, the method continues to box 906. If the architecture audit team 208 determines that there are no exceptions to approved technologies in the project data 202, the method proceeds to box 910 where the architecture audit team 208 uses the review facilitation tool 206 to submit a recommendation to approve the project data 202 for the submitted project.

In box 906, the architecture audit team 208 uses the review facilitation tool 206 to convey an exception to approved technology for the project data 202 to the technology management team 212 comprising subject matter experts from each of multiple domains. Because the subject matter experts are appointed by directors from each domain in the organization, the technology management team can take into account architectural considerations, operational considerations, financial considerations, and business considerations for the submitted project, in contrast to project decisions made by enterprise architects that often fail to take all project considerations into account. For example, the review facilitation tool 206 conveys the exception by conveying the recorded data in sections 402-406 to the technology management team 212.

Further to this example, the technology management team 212 uses the review facilitation tool 206 to review the exception to the approved technology for the new software application project, as recorded by the review facilitation tool 206 for the architecture audit team 208 in sections 402-406. Continuing this example, the technology management team 212 evaluates the architectural impact of the submitted project, the installation of patches and security updates to integrate the new software application program in the enterprise, against the proposed benefits of the submitted project. The review facilitation tool 206 captures and records any recommendation in the TMT members 504 section depicted in FIG. 5. Then, the technology management team 212 votes on the new software application project, and the review facilitation tool 206 captures and records the result in TMT voting result 502 section.

In box 908, the technology management team 212 uses the review facilitation tool 206 to convey a recommendation regarding an exception to approved technology for the project data 202 to the architecture review committee 216 comprising at least one director representative from each domain. For example, the review facilitation tool 206 conveys the recommendation by conveying the recorded data in sections 502-504 to the architecture review committee 216.

In box 910, the architecture audit team 208 uses the review facilitation tool 206 to convey a recommendation regarding the project data 202 to the architecture review committee 216. For example, whether or not the architecture audit team 208 identifies an exception to an approved technology for the submitted project, the review facilitation tool 206 conveys the data in sections 402-406, as captured and recorded from the architecture audit team 208, to the architecture review committee 216. If the architecture audit team 208 identifies an exception to an approved technology for the submitted project, the action items 404 section may include specific actions to address any compatibility issues. If the architecture audit team 208 identifies no exception to an approved technology for the submitted project, the review facilitation tool 206 can leave the action items 404 section blank due to the lack of compatibility issues. In either situation, the architecture review committee 216 reviews the discussion recorded by the review facilitation tool 206 for the architecture audit team 208, and the result in ARC voting result 406.

In box 912, architecture review committee 216 uses the review facilitation tool 206 to record an architecture review committee decision on the recommendations. For example, the architecture review committee 216 reviews the data recorded by the review facilitation tool 206 for the architecture audit team 208 in sections 402-406 and the data recorded by the review facilitation tool 206 for the technology management team 212 in sections 502-504. Additionally, the director representatives in the architecture review committee 216 may discuss the project among themselves, and with any guests to the meeting of the architecture review committee 216, such as a subject matter expert invited by a director representative or the facilitator to answer any questions about the submitted project. Upon completion of the discussion by the architecture review committee 216, the review facilitation tool 206 records the decision entered by the facilitator of the architecture review committee 216.

In box 914, the architecture review committee 216 uses the review facilitation tool 206 to prompt the architecture audit team 208 with the project data 202 if the decision approves a recommended change in project architecture. For example, if the technology management team 212 recommended an exception to approved technology that is not covered by the discussion recorded by the review facilitation tool 206 for the architecture audit team 208, and the architecture review committee 216 decides to approve this recommendation, then the review facilitation tool 206 prompts the architecture audit team 208 with the project data 202, which includes the decision to change project architecture. At this point in the method, the review facilitation tool 206 returns to box 904 to evaluate the exception to the approved technology and convey the exception to the technology management team 212.

Figure 10:
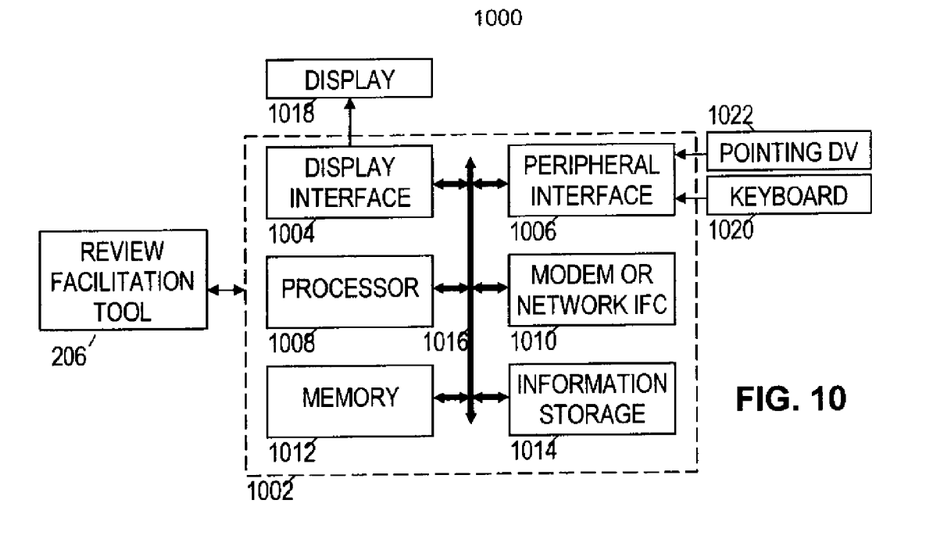
FIG. 10 shows a block diagram of an illustrative server for an enterprise infrastructure development system according to some embodiments of the present disclosure.

Turning now to FIG. 10, a block diagram 1000 of an illustrative server 1002 for the review facilitation tool 206 is depicted according to some embodiments of the present disclosure. The server 1002 may comprise a display interface 1004, a peripheral interface 1006, a processor 1008, a modem or other suitable network interface 1010, a memory 1012, an information storage device 1014, and a bus 1016. The server 1002 may be a bus-based computer, with the bus 1016 interconnecting the other elements and carrying communications between them. The display interface 1004 may take the form of a video card or other suitable display interface that accepts information from the bus 1016 and transforms it into a form suitable for a display 1018. Conversely, the peripheral interface 1006 may accept signals from a keyboard 1020, and other input devices such as a pointing device 1022, and transform them into a form suitable for communication on the bus 1016. Such forms suitable for communication may include a recommendation regarding an exception to the approved technology for the submitted project.

The processor 1008 gathers information from other system elements, including input data from the peripheral interface 1006, and program instructions and other data from the memory 1012, the information storage device 1014, or from a remote location via the network interface 1010. The processor 1008 carries out the program instructions and processes the data accordingly. The processor 1008 executes instructions for the review facilitation tool 206 application. The program instructions may further configure the processor 1008 to execute instructions for the review facilitation tool 206 application to send data to other system elements, comprising information for the user which may be communicated via the display interface 1004 and the display 1018, information such as forms 202-A, 202-B, 202-C, 202-D, 202-E, and 202-F, as depicted in FIGS. 3-8.

The network interface 1010 enables the processor 1008 to communicate with remote systems via a network. The memory 1012 may serve as a low-latency temporary store of information for the processor 1008, and the information storage device 1014 may serve as a long term (but higher latency) store of information, including information such as forms 202-A, 202-B, 202-C, 202-D, 202-E, and 202-F, as depicted in FIGS. 3-8.

The processor 1008, and hence the server 1002 as a whole, operates in accordance with one or more programs stored on the information storage device 1014, such as a review facilitation tool 206 application. The processor 1008 may copy portions of the programs into the memory 1012 for faster access, and may switch between programs or carry out additional programs in response to user actuation of the input device. The additional programs, such as the review facilitation tool 206 application, may be retrieved from the information storage device 1014 or may be retrieved from remote locations via the network interface 1010. One or more of these programs, including the review facilitation tool 206 application, configures the server 1002 to carry out at least one of the enterprise infrastructure development methods disclosed herein.

The server 1002 is described as a general server, although any electronic device having some amount of computing power coupled to a user interface may be configured to carry out the methods disclosed herein. Among other things, personal computers, portable computers, personal digital assistants (RDAs) and mobile phones may be configured to carry out aspects of the disclosed enterprise infrastructure development methods.

The display 1018 may be a video monitor, but may take many alternative forms such as a printer, a speaker, or other means for communicating information to a user, information such as forms 202-A, 202-B, 202-C, 202-D, 202-E, and 202-F, as depicted in FIGS. 3-8. The input device for the user interface is shown as the keyboard 1020, but may similarly take many alternative forms such as a button, a mouse, a keypad, a dial, a motion sensor, a camera, a microphone or other means for receiving information from a user, information such as the information in 202-A, 202-B, 202-C, 202-D, 202-E, and 202-F, as depicted in FIGS. 3-8.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

What is claimed is:

1. A computer implemented method, comprising:
submitting, with a review facilitation tool stored in a non-transitory computer readable media and executed by a processor, project data to an architecture audit team of an enterprise, wherein the project data includes identification of proposed technology for a project;
conveying, with the review facilitation tool, an exception identified by the architecture audit team to a technology management team of the enterprise, the technology management team comprising subject matter experts from each of multiple domains, wherein the exception is identified when the proposed technology for the project includes a technology that is not included in a group of approved technologies that meet architectural guiding principles for the enterprise;
conveying, with the review facilitation tool, a recommendation made by the technology management team regarding the exception to an architecture review committee of the enterprise, the architectural review committee comprising a director representative from each of the multiple domains, wherein the recommendation regarding the exception comprises a voting record for each of the subject matter experts on the technology management team; and
recording, with the review facilitation tool, a decision by the architectural review committee on the recommendation regarding the exception.

2. The method of claim 1 wherein the decision is based on architectural considerations, operational considerations, financial considerations, and business considerations.

3. The method of claim 1 further comprising conveying a recommendation to approve the project data to the architecture review committee, wherein the recommendation to approve the project data is conveyed when the architectural audit team determines that the proposed technology for the project has no exceptions to the approved technologies.

4. The method of claim 1 wherein the subject matter expert from each of the multiple domains is appointed by a director from a corresponding domain.

5. The method of claim 1 wherein the director representative is one of a director and a representative appointed by the director.

6. The method of claim 1 further comprising prompting the architecture audit team with the project data if the decision approves a recommended change in project architecture.

7. A computer implemented system, comprising:
a memory comprising a non-transitory computer readable media;
one or more processors; and
a review facilitation tool stored in the memory that, when executed by the one or more processors, configures the one or more processors to:
submit project data to an architecture audit team of an enterprise, wherein the project data includes identification of proposed technology for a project;
convey an exception identified by the architectural audit team to a technology management team of the enterprise, the technology management team comprising subject matter experts from each of multiple domains, wherein the exception is identified when the proposed technology for the project includes a technology that is not included in a group of approved technologies that meet architectural guiding principles for the enterprise;
convey a recommendation made by the technology management team regarding the exception to an architecture review committee of the enterprise, the architecture review committee comprising a director representative from each of the multiple domains, wherein the recommendation comprises a summary for director representatives whose domains are not impacted by the exception and links to details for director representatives whose domains are impacted architecturally; and
record a decision on the recommendation regarding the exception.

8. The system of claim 7 wherein the decision is based on architectural considerations, operational considerations, financial considerations, and business considerations.

9. The system of claim 7 wherein the review facilitation tool further configures the one or more processors to convey a recommendation to approve the project data to the architecture review committee, wherein the recommendation to approve the project data is conveyed when the architecture audit team determines that the proposed technology for the project has no exceptions to the approved technologies.

10. The system of claim 7 wherein the subject matter expert from each of the multiple domains is appointed by a director from a corresponding domain.

11. The system of claim 7 wherein the recommendation regarding the exception comprises a voting record for each subject matter expert.

12. The system of claim 7 wherein the director representative is one of a director and a representative appointed by the director.

13. The system of claim 7 wherein the review facilitation tool further configures the one or more processors to prompt the architecture audit team with the project data if the decision approves a recommended change in project architecture.

14. A computer program product for a review facilitation tool, the computer program product comprising:
a non-transitory computer readable medium having computer readable program code embodied therein;
computer readable program code configured to submit project data to an architecture audit team of an enterprise, wherein the project data includes identification of proposed technology for a project;
computer readable program code configured to convey an exception identified by the architecture audit team to a technology management team of the enterprise, the technology management team comprising subject matter experts from each of multiple domains, wherein the exception is identified when the proposed technology for the project includes a technology that is not included in a group of approved technologies that meet architectural guiding principles for the enterprise;
computer readable program code configured to convey a recommendation made by the technology management team regarding the exception to an architecture review committee of the enterprise, the architecture review committee comprising a director representative from each of the multiple domains, wherein the recommendation regarding the exception comprises a voting record for each subject matter expert;
computer readable program code configured to convey a recommendation to approve the project data to the architecture review committee, wherein the recommendation to approve the project data is conveyed when the architecture audit team determines that the proposed technology for the project has no exceptions to the approved technologies; and computer readable program code configured to recording a decision by the architecture review committee on the recommendations, wherein the decision is based on architectural considerations, operational considerations, financial considerations, and business considerations.

15. The computer program product of claim 14 wherein the subject matter expert from each of the multiple domains is appointed by a director from a corresponding domain.

16. The computer program product of claim 14 wherein the director representative is one of a director and a representative appointed by the director.

17. The computer program product of claim 14 further comprising computer readable program code configured to prompt the architecture audit team with the project data if the decision approves a recommended change in project architecture in the recommendation regarding the exception.

* * * * *